(12) United States Patent
Ruppert

(10) Patent No.: US 12,463,579 B2
(45) Date of Patent: Nov. 4, 2025

(54) EXCITER CIRCUIT FOR AN EXTERNALLY EXCITED SYNCHRONOUS MACHINE, MOTOR VEHICLE, AND METHOD FOR DE-EXCITING AN EXCITER WINDING

(71) Applicant: AUDI AG, Ingolstadt (DE)

(72) Inventor: Daniel Ruppert, Lenting (DE)

(73) Assignee: AUDI AG, Ingolstadt (DE)

( * ) Notice: Subject to any disclaimer, the term of this patent is extended or adjusted under 35 U.S.C. 154(b) by 245 days.

(21) Appl. No.: 18/465,783

(22) Filed: Sep. 12, 2023

(65) Prior Publication Data

US 2024/0088821 A1   Mar. 14, 2024

(30) Foreign Application Priority Data

Sep. 13, 2022   (DE) .......................... 102022123264.6

(51) Int. Cl.
   *H02P 9/10*       (2006.01)
   *B60L 3/00*       (2019.01)
   *H02P 29/032*     (2016.01)

(52) U.S. Cl.
   CPC .......... *H02P 29/032* (2016.02); *B60L 3/0061* (2013.01); *H02P 2207/05* (2013.01)

(58) Field of Classification Search
CPC ...... H02P 9/10; H02P 29/032; H02P 2207/05; H02P 9/48; B60L 3/0061
See application file for complete search history.

(56) References Cited

U.S. PATENT DOCUMENTS

| | | | |
|---|---|---|---|
| 6,351,104 B1 * | 2/2002 | Koelle ...................... | H02P 9/48 322/77 |
| 10,862,374 B2 | 12/2020 | Sudan et al. | |
| 11,689,072 B2 | 6/2023 | Schiedermeier et al. | |
| 2011/0298430 A1 * | 12/2011 | Platero Gaona .......... | H02P 9/10 322/59 |
| 2017/0070126 A1 * | 3/2017 | Sudan ....................... | H02P 9/10 |

FOREIGN PATENT DOCUMENTS

| | | |
|---|---|---|
| DE | 102013213539 A1 | 1/2015 |
| DE | 102014209607 A1 | 11/2015 |
| DE | 102016219770 A1 | 4/2018 |
| DE | 102017204091 A1 | 9/2018 |
| DE | 102019124212 A1 | 3/2021 |
| DE | 102020120814 A1 | 2/2022 |

* cited by examiner

*Primary Examiner* — Cortez M Cook
(74) *Attorney, Agent, or Firm* — Seed Intellectual Property Law Group LLP

(57) ABSTRACT

An exciter circuit for an externally excited synchronous machine, including voltage supply terminals for a voltage supply, exciter current terminals to be connected to an exciter winding of the synchronous machine, a bridge circuit hooked up to the voltage supply terminals, a controller and a protective layout at the side with the exciter current terminals, including: a semiconductor switch switched in series with the exciter winding, and in parallel with a protective diode which is blocking in an exciter current flow direction, and a cut-off voltage decay path running in parallel with the exciter winding and having a connection point between the bridge circuit and the semiconductor switch, having at least one Zener diode layout which is blocking in the exciter current flow direction, which defines a breakdown voltage and includes at least one Zener diode. The controller opens the semiconductor switch when a rapid de-exciting signal is present.

17 Claims, 4 Drawing Sheets

EXCITER CIRCUIT FOR AN EXTERNALLY EXCITED SYNCHRONOUS MACHINE, MOTOR VEHICLE, AND METHOD FOR DE-EXCITING AN EXCITER WINDING

BACKGROUND

Technical Field

The disclosure relates to an exciter circuit for an externally excited synchronous machine, comprising two voltage supply terminals for the voltage supply, two exciter current terminals to be connected to an exciter winding, especially a rotor winding, of the externally excited synchronous machine, and a bridge circuit to be hooked up to the voltage supply terminals, especially one in the form of an asymmetrical full bridge. Moreover, the disclosure relates to a motor vehicle and a method of de-exciting an exciter winding of an externally excited synchronous machine.

Description of the Related Art

For hybrid and electric vehicles it is known how to use synchronous machines as traction machines. While traditional drive systems have often used permanently excited synchronous machines, it has also been proposed in recent time to employ externally excited synchronous machines in motor vehicles as traction machines. In externally excited synchronous machines (often also called current excited synchronous machines), one can do without the use of cost-intensive permanent magnets in the rotor. The necessary magnetic field in the rotor is established by an exciter winding as the rotor winding, which can be fed with direct current as exciter current, for example across slip rings.

In order to provide this direct current, as a further power electronics besides the inverter (traction inverter) associated with the stator windings, an exciter circuit is required as an additional power electronic circuit element. Such an exciter circuit may require, for example, a power of around 15 kW. The exciter circuit comprises as its principal component, usually a bridge circuit, especially an asymmetrical full bridge circuit, which provides the exciter current at corresponding exciter current terminals for the energizing of the exciter winding.

Both the inverter connected to the stator windings of the externally excited synchronous machine and the exciter circuit can be physically connected to at least one common intermediate circuit capacitor, which is usually situated structurally at the inverter and energized from this, while the at least one intermediate circuit capacitor in turn can be connected to the high-voltage battery of the motor vehicle, i.e., the traction battery. In the recuperation operating mode, i.e., in the generator operation of the externally excited synchronous machine, the at least one intermediate circuit capacitor and the high-voltage battery of the motor vehicle can be charged.

Depending on the operating state of the inverter, different operating states of the exciter circuit and thus of the exciter group formed from the exciter circuit and the exciter winding can be provided. Thus, a first operating state usually corresponding to a switching state of the bridge circuit can provide that an exciter current is built up. Through freewheeling states, for example, a highside freewheeling and a lowside freewheeling in an asymmetrical full bridge circuit, exciter current can be dissipated inside the rotor. An operating state is also conceivable in which the exciter current is fed back across the voltage supply terminals to at least one intermediate circuit capacitor or to the high-voltage network of the motor vehicle.

The dissipation of the exciter current and the associated demagnetization of the rotor is usually accomplished through the freewheeling operating states. In these states, the inductance of the exciter winding means that the exciter current at first continues to flow and only slowly is dissipated by ohmic resistances. Yet a dissipation of the rotor current can also occur through feeding back.

However, cases exist in a motor vehicle and other applications in which a rapid de-exciting of the rotor, and hence a kind of emergency de-exciting is needed. For example, if an accident or a relevant defect occurs in a fully magnetized, rapidly rotating rotor of the externally excited synchronous machine, there is a need to de-excite, and therefore demagnetize, the rotor as fast as possible in order to both eliminate the energy and disconnect the electrical driving torque. Thus, in such an emergency situation, the exciter current must be interrupted at once, so that the immediate demagnetization of the rotor occurs and the safety requirements are met.

In the presently known exciter circuits, the topology does not provide for such a rapid discharging, so that there is a need for improvement in this regard.

DE 10 2020 120 814 A1 relates to a method for checking a rapid de-exciting path of an exciter circuit for an externally excited electric machine in which a first and a second switching element are switched in series between a positive and a negative voltage terminal and a fourth switching element is switched in parallel with the second switching element. An exciter winding of the externally excited electric machine is connected at the first end between the first and second switching element and also at the second end to the second switching element. An electrical component is connected at one end to the second end of the exciter winding and at the other end to one of the power supply terminals, while the exciter winding is charged when the third switching element is closed, the third switching element is then opened, and a characteristic quantity for a current flow in a path comprising the exciter winding and the electrical component when the third switching element is opened is detected. With the aid of this quantity, the function of the electrical component is checked. For a rapid de-exciting, the first and the third switching element can be opened, so that the exciter winding is de-excited against the positive supply voltage or against the voltage arising on account of the electrical component, which should be significantly faster in time.

DE 10 2016 219 770 A1 relates to a synchronous machine having a rotor and a circuit for demagnetization of the rotor. When dissipating the energy of the rotor, a rotor current is conducted into a circuit branch in which at least one component provided for the demagnetization is situated, and this component decreases its resistance starting at a given voltage value. Thus, the entire or the bulk of the energy stored in the rotor will be eliminated, without the danger of overcharging the capacitor or the intermediate circuit capacitor. The component here may comprise one or more Zener diodes or one or more suppressor diodes or one of more varistors.

DE 10 2013 213 539 A1 relates to a method for producing and/or operating an electric machine, wherein voltage differences are balanced out by means of an electrically conductive diversion device, in order to minimize the formation of stray electrical fields. In particular, a voltage difference between shaft and ground can be significantly reduced or prevented here, without there needing to be a current flow across the shaft and/or without the shaft needing to be in contact with the grounding slip ring of the slip ring assembly.

BRIEF SUMMARY

Embodiments of the disclosure provide an exciter circuit to provide enhanced safety and/or better protection in emergency cases.

According to the disclosure it is proposed, in an exciter circuit of the kind mentioned above, that the exciter circuit moreover comprises controller and, at the side with the exciter current terminals, a protective layout, comprising:
- a semiconductor switch switched in series with the exciter winding, being switched in parallel with a protective diode which is blocking in the exciter current flow direction, and
- a cut-off voltage decay path running in parallel with the exciter winding and having a connection point between the bridge circuit and the semiconductor switch, having at least one Zener diode layout which is blocking in the exciter current flow direction, which defines a breakdown voltage and comprises at least one Zener diode,
- wherein the controller, in operation, opens the semiconductor switch when a rapid de-exciting signal is present.

Thus, it is proposed to provide additional components in order to realize a safety function, namely the protective layout, which can also be understood as being a protective circuit, between the bridge circuit, which remains unmodified, and the exciter winding, and serving in particular for the rapid de-exciting of the exciter winding and thus a demagnetization of the rotor. In other words, the circuit topology located in the exciter circuit is expanded. For this, there is added to one of the exciter current terminals, preferably in the return path of the exciter current, a semiconductor switch (often also called a power semiconductor), which is switched in series with the exciter winding. Between the semiconductor switch and the bridge circuit, a cut-off voltage decay path is switched in parallel with the semiconductor switch and the exciter current terminals, thus in the connected state of the exciter winding. The cut-off voltage decay path comprises a Zener diode layout which is basically blocking in the exciter current flow direction, and therefore up to the breakdown voltage, so that the electric power provided by the exciter current in the normal operation continues to be taken entirely through the exciter winding.

The semiconductor switch can be configured as an insulated-gate bipolar transistor (IGBT) and/or a metal-oxide-semiconductor field-effect transistor (MOSFET), especially an N-channel MOSFET, as is basically known. The semiconductor switch is switched in parallel with a protective diode, especially another Zener diode. The further Zener diode serves for protecting the power semiconductor in the disconnect process, since a reverse voltage is built up by the cutting out of the inductance. In the present instance, it serves the further purpose of creating an energy decay path, as will be explained more closely in the following.

In normal operation, the additional semiconductor switch is switched to conduct, i.e., it is closed, and the entire exciter current flows across the semiconductor switch and the exciter winding of the rotor, connected for example across slip rings to the externally excited synchronous machine. The semiconductor switch is advisedly designed and adapted so that its power losses are minimized. In particular, since nothing has changed at the bridge circuit and the additional semiconductor switch is closed in normal operation, all previous options for operating states or operating modes remain. In particular, a slow de-exciting also continues to be possible, for example, through a feeding back of the rotor current, during which the available energy can be fed to an intermediate circuit capacitor of the inverter, exactly as in a freewheeling mode. In these operating modes, as already mentioned, the additional semiconductor switch remains closed and no current of any kind flows through the cut-off voltage decay path or the further Zener diode.

Now, if a situation arises in which the fastest possible de-exciting, and thus demagnetization, of the rotor should occur, i.e., if there is a defect or a vehicle accident, for example, the exciter current needs to be dissipated in the shortest possible time, in order to take away the stored electrical energy and thereby both assure electrical safety and also switch the electrical drive train torque-free.

By opening the semiconductor switch, the current flow in the direction of the voltage supply terminals and thus any exciter current is interrupted. In other words, it is possible to interrupt the exciter current flow at once if need be and to switch the rotor currentless thanks to the power semiconductor in series connection with the exciter winding. Since the exciter winding, or more precisely its inductance (rotor inductance), strives to maintain the exciter current flow through the inductance, a reverse voltage (cut-off voltage) is produced, which increases abruptly, especially to values exceeding the operating voltage. For example, depending on the exciter current, the inductance of the exciter winding may be 0.4 to 1.5 H.

Because of the at least one Zener diode of the Zener diode layout, which also resist, and therefore block, this cut-off voltage on account of the parallel connection, a large resistance occurs in the cut-off voltage decay path. This, in turn, has the result that the cut-off voltage increases extremely fast to the breakdown voltage. Once the breakdown voltage is reached, the cut-off voltage can be dissipated extremely fast by the breakthrough of the at least one Zener diode, i.e., the energy is transformed into heat, and the heat arising in this way is advisedly taken away by an appropriate cooling device. In this regard, the protective diode of the semiconductor switch will be used advisedly, since it clears a path for a de-exciting current in the direction of the dissipation of the cut-off voltage, yet continues to be blocking in the opposite direction. Furthermore, the semiconductor switch is opened.

It should further be noted in this place that the exciter current of the rotor can be securely disconnected directly in an emergency, since the semiconductor switch is situated directly in series with the exciter winding, and therefore within the circuit formed by the exciter winding and the cut-off voltage decay path. If the semiconductor switch were situated outside the circuit, an operating point might exist in normal operation or during a defect where the exciter current is not interrupted, but instead is freewheeling through the described circuit. This is undesirable in terms of functional safety and it is prevented in the context of the present disclosure.

The rotor thus becomes demagnetized, so that the externally excited synchronous machine in particular is also torque-free.

In summary, the present disclosure thus achieves a securing of functional safety requirements in all operating states of the motor vehicle. The protective layout enhances the safety, especially in terms of potentially occurring fires, and makes possible the fast de-exciting in event of a fault or an accident. Thanks to the locating of the protective layout in the exciter circuit, the cost expense for material costs can be reduced and a discrete additional protective circuit is no longer necessary. The expense of surface mounting or assembly of a discrete protective circuit is also eliminated in the production/assembly process. The robustness of the overall system is increased, and design space and design size are decreased. In general, it can be said that the protective layout and the bridge circuit will be advisedly placed on the same substrate.

The Zener diode layout can advisedly be configured such that the breakdown voltage is larger than an operating voltage used to generate the exciter current. In this way, it can be assured that no breakthrough can occur during the usual operation. For example, it can be provided that the breakdown voltage is at least 10% greater than the operating voltage. For example, if the operating voltage is 900 V, the breakdown voltage can be chosen at 1000 V. Basically, the most diverse of values are conceivable for the breakdown voltage, so that these can lie, generally speaking, in a range of 400 to 1300 V.

Preferably, the Zener diode layout can comprise multiple Zener diodes switched in series. Thanks to the series circuit of multiple Zener diodes, it is possible to achieve given values of the breakdown voltage with no problem in the usual design of the individual Zener diodes. For example, if Zener diodes are used with an individual breakdown voltage of 100 V, a breakdown voltage of 1200 V can be produced by a series circuit of twelve such Zener diodes.

Advisedly, the controller can be configured in addition to trigger the bridge circuit in a recovery mode when the rapid de-exciting signal is present. If the bridge circuit is designed as an asymmetrical full bridge, the controller can be designed to open the corresponding bridge switches in addition to the semiconductor switch. In this way, portions of the exciter current power which nevertheless make it through to the voltage supply terminals can still be feasibly dissipated and a better protection of the intermediate circuit and other components will be achieved. For despite the abrupt rise in the cut-off voltage, no energy can be fed back to the intermediate circuit.

Especially advantageously, the controller can be configured to close the semiconductor switch and to operate the bridge circuit in a recovery mode or a freewheeling mode after a cut-off voltage on the exciter winding falls below the breakdown voltage and/or after the lapsing of a predetermined time. Hence, when the voltage is again in the range of a normal operating point, the semiconductor switch will be closed again, and then the excess energy can be fed back for example to the intermediate circuit once again. In other words, when the cut-off voltage drops below the breakdown voltage, the critical moment has passed, and the remaining energy still present can still be utilized somewhat more slowly in traditional manner, and therefore in freewheeling or by feeding back. In order to determine a current value of the cut-off voltage, it is conceivable for example to use an appropriate voltage sensor. It is also possible to check whether a current flow is still occurring in the cut-off voltage decay path, and hence the breakdown voltage is still exceeded, or not (breakdown voltage falls short). If typical times are known that are needed to dissipate the voltage surge after interruption of the exciter current, these can also be used to define a given time span, after which the residual energy can be de-excited slowly in freewheeling or by feeding back, as is known.

The controller can moreover be configured to operate the semiconductor switch in the closed state in a normal operation, in which no rapid de-exciting signal is present. This means that in normal operation the exciter circuit basically behaves as if the protective layout were not present, since the semiconductor switch is designed for the most minimal resistance.

Specifically, the rapid de-exciting signal can be an accident signal and/or a fault signal. An accident signal can be provided for example by accident sensors, such as crash sensors, or by a controller of a motor vehicle evaluating its sensor data, in which the externally excited synchronous machine is used as a traction machine. Fault signals, which describe, for example, a fault requiring the disconnecting of the externally excited synchronous machine, can be provided for example by corresponding diagnostic controllers or a controller associated with the externally excited synchronous machine itself.

Besides the exciter circuit, the present disclosure also relates to a motor vehicle comprising an externally excited synchronous machine, an exciter circuit according to the present disclosure which is associated with the externally excited synchronous machine, and a power electronics layout comprising an inverter connected to a high-voltage network, especially one associated with the synchronous machine. The exciter circuit is connected here to the exciter winding of the externally excited synchronous machine, which is situated in the rotor, and it can likewise be connected by way of the voltage supply terminals to the high-voltage network. In particular, the power electronics layout comprises, at the inputs of the inverter, at least one intermediate circuit capacitor, across which both the inverter and the exciter circuit can be connected to the high-voltage network. The inverter is in particular a three-phase inverter, which accordingly can comprise a B6 bridge circuit. The inverter is connected to the stator windings of the externally excited synchronous machine. All statements regarding the exciter circuit according to the disclosure can be applied accordingly to the motor vehicle according to the disclosure, with which the already mentioned benefits can therefore likewise be obtained.

The exciter circuit can be realized specifically as part of an exciter module, especially one comprising a housing. This simplifies the handling, increases the safety, and allows in particular an installation comparable to power modules of the power electronics layout, for which one power module can be provided for example for each phase.

In an especially advantageous configuration of the present disclosure, the motor vehicle can comprise moreover a cooling device having a heat sink, to which the exciter circuit is thermally connected for heat dissipation by the protective layout, especially in the exciter module. Also at least one portion of the power electronics layout can be thermally connected with particular advantage to such a heat sink for heat dissipation, especially as a power module comprising at least one housing. By the connecting of the exciter circuit, especially in the form of the exciter module, directly to the heat sink, it is possible to give off directly to the heat sink and thus the cooling device not only the power loss arising in the bridge circuit, but also the heat arising upon breakthrough especially at the Zener diode layout during the rapid de-exciting. Even so, it should be noted that a measure of the resulting power loss is also drained off directly to the heat sink by the additional semiconductor switch of the protective layout, since the protective layout is integrated in the exciter circuit, especially the exciter module, and thus it is connected as closely as possible to the heat sink. Thanks to the connection of the protective layout to the preferably active cooling of the cooling device, the large quantum of energy of the rotor, specifically that of the exciter current in the exciter winding, can be managed, which is especially easily possible by the integration in the exciter circuit, especially the exciter module, since it has been proposed for the exciter module to connect it to the heat sink, which also actively cools the inverter. In other words, an extremely robust overall system is accomplished in this way, in which the rapid de-exciting function is provided by the exciter circuit and the protective layout with the exciter circuit, especially as an exciter module and/or on a common substrate, is also connected to the heat sink. In particular, thanks to the excellent cooling, even the components of the protective layout experience only a normal temperature variation, having a positive impact on their service life.

As was already mentioned, the motor vehicle can be in particular a hybrid motor vehicle, but preferably also an electric motor vehicle. In this case, the externally excited synchronous machine is a traction machine of the motor vehicle, and hence part of the drive train of the motor vehicle. High demands for functional safety are placed precisely on electric motor vehicles, but also on hybrid motor vehicles, and these can be especially easily met with the procedure according to the disclosure.

Finally, the disclosure also relates to a method for de-exciting an exciter winding of an externally excited synchronous machine with an exciter circuit according to the present disclosure or in a motor vehicle according to the present disclosure, wherein the semiconductor switch is opened when the rapid de-exciting signal is present. Also, all statements about the exciter circuit according to the disclosure and the motor vehicle according to the disclosure can be applied to the method according to the disclosure.

The controller can be realized in particular as part of a controller of the motor vehicle, for example, a drive controller or also a controller specially provided for the power electronics of the externally excited synchronous machine.

BRIEF DESCRIPTION OF THE SEVERAL VIEWS OF THE DRAWINGS

Further benefits and details of the present disclosure will emerge from the exemplary embodiments described in the following, and also with the aid of the drawings.

DETAILED DESCRIPTION

Figure 1:
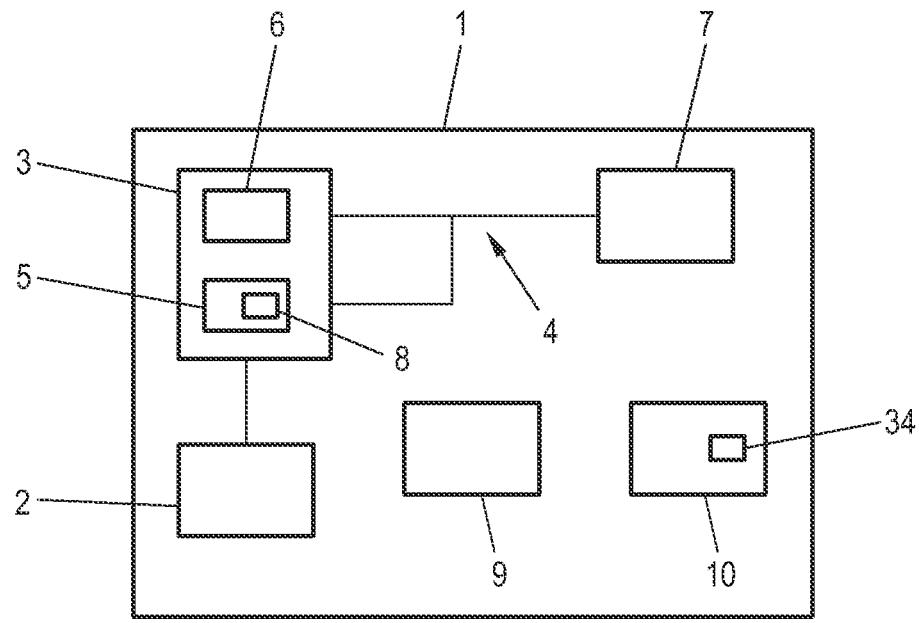
FIG. 1 shows a schematic diagram of a motor vehicle according to the disclosure.

FIG. 1 shows a schematic diagram of a motor vehicle 1 according to the disclosure, in the present instance an electric motor vehicle. The electric motor vehicle comprises, in a drive train not shown here in further detail, a traction machine, which is configured as an externally excited synchronous machine 2. The externally excited synchronous machine 2 comprises a rotor, not shown in greater detail in FIG. 1, having an exciter winding, and a stator having stator windings, one of the stator windings being provided for each of three phases.

The externally excited synchronous machine 2 is connected across a power electronics layout 3 to a high-voltage network 4 of the motor vehicle 1. For the connection of the exciter winding to the high-voltage network 4, the motor vehicle 1 further comprises an exciter circuit 5, which can also be viewed as being part of the power electronics layout 3. The power electronics layout 3 encompasses an inverter 6, by which the stator windings are connected to the high-voltage network 4. The high-voltage network 4 here has a higher voltage than a low-voltage network of the motor vehicle 1, not being shown here. The operating voltage of the high-voltage network 4 can lie, for example, in a range above 200 V, especially 350 to 1000 V, and it is a DC voltage network. The high-voltage network 4 is powered from a high-voltage battery 7. Other high-voltage components or network components can also be provided in the high-voltage network 4 and be connected to it, such as a DC voltage converter provided between the low-voltage network and the high-voltage network, an on-board charger for the high-voltage battery 7, an electrical air conditioning compressor and/or an electrical heater.

The power electronics layout 3 can also include an intermediate circuit with at least one intermediate circuit capacitor, by which the exciter circuit 5 is also connected to the high-voltage network 4.

In the present instance, a protective layout 8 is integrated in the exciter circuit 5, providing a cut-off voltage decay path having a Zener diode layout, by way of which the electrical energy of an exciter current can be converted into thermal energy.

Also in this context the motor vehicle 1 furthermore comprises a cooling device 9, having a cooling fluid circulating in a cooling circuit, for example, cooling water, and serving for the cooling of the inverter 6 as well as the exciter circuit 5 with the protective layout 8. Moreover, the motor vehicle also comprises a control device 10 for controlling the operation of the mentioned components, which can encompass one or more controllers.

Figure 2:
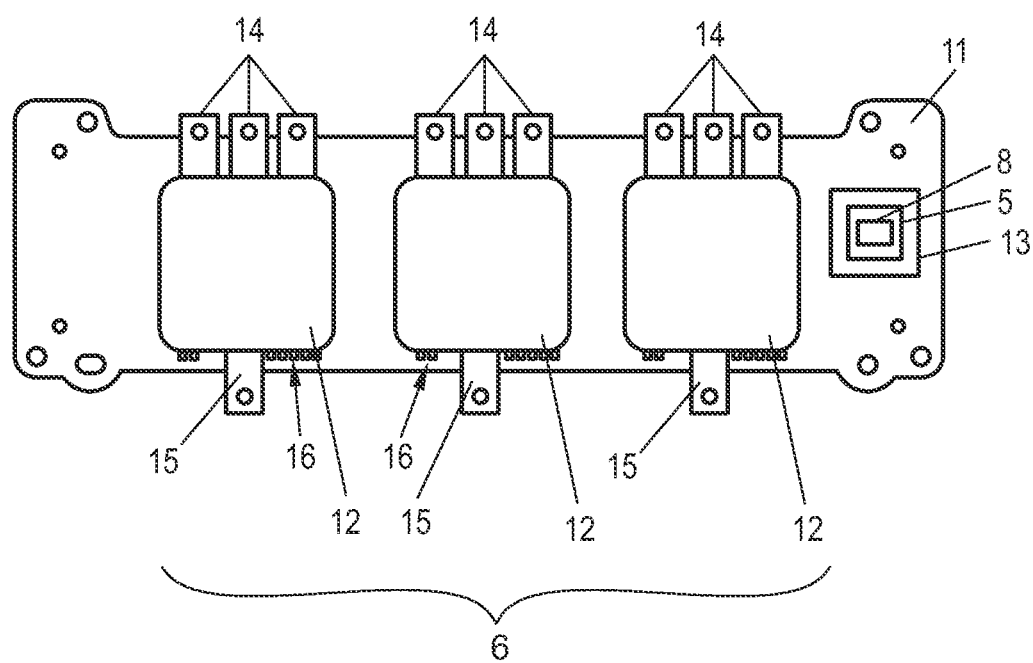
FIG. 2 shows a view of a heat sinks with modules thermally connected to it.

FIG. 2 shows for example a heat sink 11 of the cooling device 9, which in the present instance comprises, not otherwise shown in detail, at least one duct and/or at least one cavity through which cooling fluid moves to the cooling circuit. Secured on the heat sink 11 and thermally connected to it for the cooling are, in addition to power modules 12 for each phase, together forming the inverter 6, also an exciter module 13, in which the exciter circuit 5 with the protective layout 8 is arranged in a housing. In this way, the heat sink 11 can also cool the components of the protective layout 8 in addition to bridge switches of a bridge circuit of the exciter circuit 5, configured as semiconductor switches.

The power modules 12 can also comprise housings which enclose the corresponding power electronics components, in particular also including semiconductor switches. In the present instance, there are also shown the power terminals 14 of the power modules 12 for the high-voltage network 4 as well as the power terminals 15 for the stator windings of the individual phases and corresponding actuating terminals 16. For clarity of drawing, these are not shown on the exciter module 13.

Figure 3:
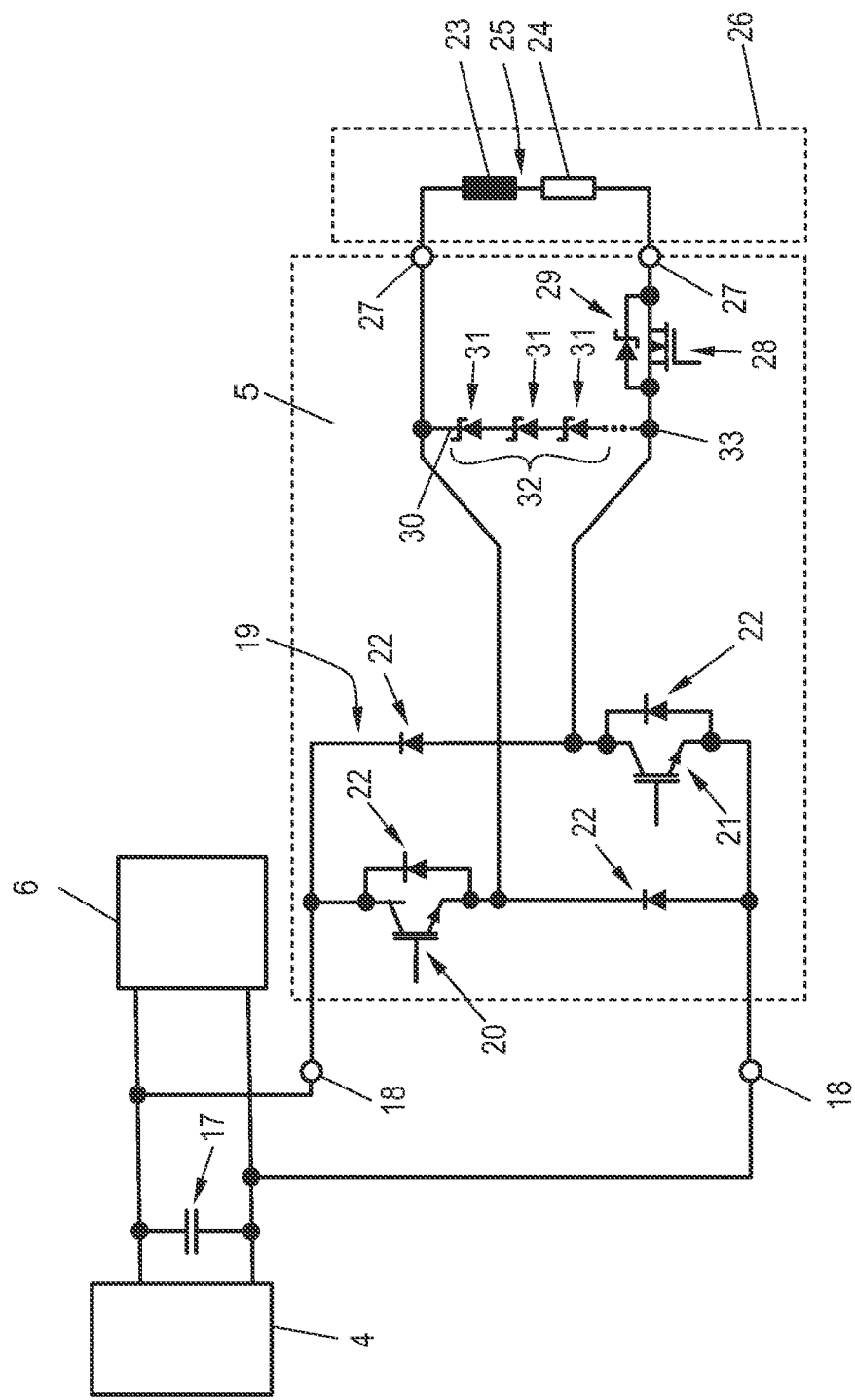
FIG. 3 shows a circuit diagram of an exemplary embodiment of an exciter circuit.

FIG. 3 shows a circuit diagram of an exciter circuit 5 as well as the surrounding components in an exemplary embodiment. The inverter 6, configured here as a B6 bridge circuit, is not shown more closely. By an intermediate circuit with intermediate circuit capacitors 17, which are switched in parallel with both the inverter 6 and the exciter circuit 5, the inverter 6 and the exciter circuit 5 are connected to the high-voltage network 4.

For this, the exciter circuit 5 has voltage supply terminals 18, situated next to a bridge circuit 19, here an asymmetrical full bridge, on a substrate. The bridge circuit 19, as is basically known, comprises two bridge switches 20, 21, which can be configured for example as IGBTs or MOSFETs. Furthermore, diodes 23 are provided, as is basically known.

Moreover, the exciter circuit 5 comprises exciter current terminals 27 for connection to the exciter winding 25 in the rotor 26 of the externally excited synchronous machine 2, shown here as an equivalent diagram with the inductance 23 and the ohmic resistance 24. Now, between the exciter current terminals 27 and the bridge circuit 19 there is provided, also arranged on the substrate here, a protective layout 8, comprising a semiconductor switch 28 connected in series with the exciter winding 25, and being connected in parallel with a protective diode 29, here a Zener diode, in the blocking direction. Moreover, the protective layout 8 comprises a cut-off voltage decay path 30, having at least one Zener diode 31, in the present case multiple Zener diodes 31, as part of a Zener diode layout 32. The cut-off voltage decay path 30 is switched in parallel with the exciter winding 25, there being a connection point 33 between the semiconductor switch 28 and the bridge circuit 25. The semiconductor switch 28 is arranged for example in the return path and in the present instance it is realized as an N-channel MOSFET, although it can also be realized as an IGBT. It is part of a cut-off voltage decay circuit formed by the exciter winding 25 and the cut-off voltage decay path 30.

The semiconductor switch 28 can be actuated by controller 34 of the control device 10, cf. FIG. 1. In a normal operation, when no rapid de-exciting signal is present, the semiconductor switch 28 will be closed. Hence, the usual operating states or operating modes which can be accomplished through the asymmetrical full bridge will be used.

Figure 4:
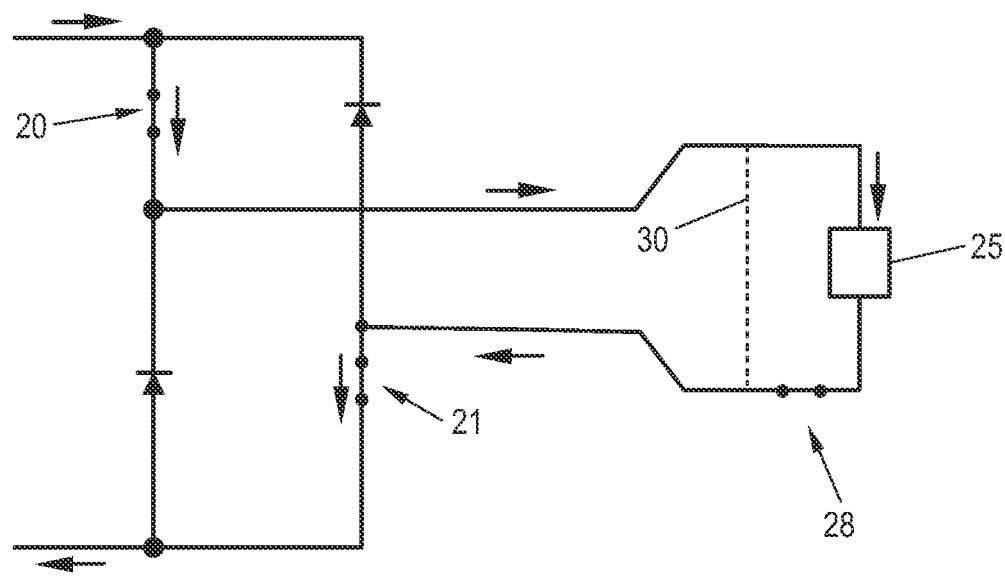
FIG. 4 shows schematically, the current flow in a first operating mode of the normal operation.
Figure 5:
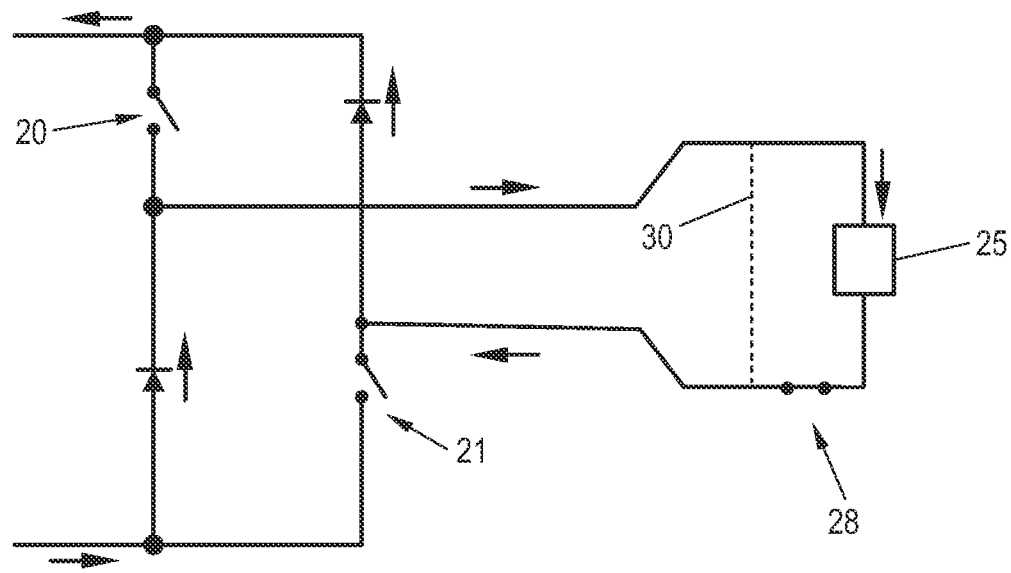
FIG. 5 shows schematically, the current flow in a second operating mode of the normal operation.

For example, FIG. 4 and FIG. 5 show with the switches 20, 21 and 28 indicated here only in simplified manner the current flow for an operating mode to build up a rotor current (FIG. 4), in which both bridge switches 20, 21 are closed, and a recovery mode (FIG. 5), in which the bridge switches 20, 21 are opened. The semiconductor switch 28 is closed.

Figure 6:
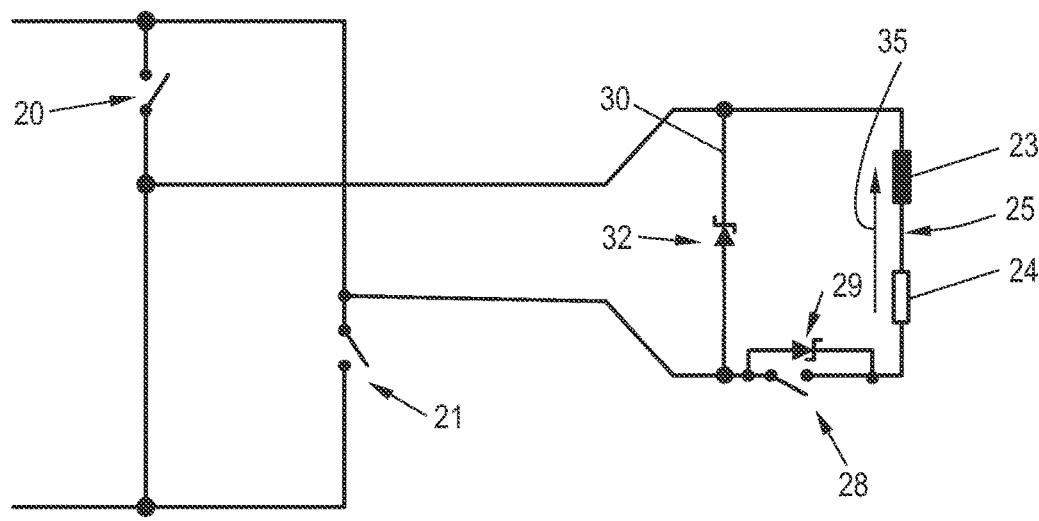
FIG. 6 shows schematically, the current flow in a rapid de-exciting operating mode.

In event of an accident or a major fault, a rapid de-exciting signal can be provided to the controller 34 through other components of the motor vehicle 1, for example accident sensors, a diagnostic controller, and the like, as an accident signal or a fault signal. When the rapid de-exciting signal is present, the controller 34 cause the semiconductor switch 28 and also in the present instance the bridge switches 20, 21 to open. The emergency operating mode illustrated schematically in FIG. 6 then results, in which the current flow in the direction of the high-voltage network 4 is interrupted by opening the semiconductor switch 28.

Since the inductance 23 strives to maintain the exciter current, a cut-off voltage is built up as a reverse voltage, cf. arrow 35. Since the Zener diodes 31 of the cut-off voltage decay path 30 are blocking, and hence constitute a large resistance, the cut-off voltage increases abruptly until reaching the breakdown voltage of the Zener diode layout 32. This is for example at least 10% higher than the operating voltage of the high-voltage network 4 and can be set specifically by the series connection of multiple Zener diodes 31. Upon reaching the breakdown voltage, the Zener diodes 31 break through and the electrical energy in the exciter winding 25 is transformed very rapidly into power loss, here, thermal energy, and taken to the heat sink 11. Thus, the rotor 26 becomes demagnetized. The large quantum of energy of the rotor 26 can be dissipated here with no problem, since the exciter circuit 5 and thus the protective layout 8 are directly connected to the active cooling by way of the cooling device 9, also see the remarks on FIG. 2 for this.

For a (slower)dissipation of any remaining residual energy, the controller 34 can be designed to switch the bridge circuit 19 to a recovery mode or a freewheeling mode when the cut-off voltage drops below the breakdown voltage or the Zener diodes 31 again become blocking, and to close the semiconductor switch 28 once again.

German patent application no. 102022123264.6, filed Sep. 13, 2022, to which this application claims priority, is hereby incorporated herein by reference, in its entirety.

Aspects of the various embodiments described above can be combined to provide further embodiments. In general, in the following claims, the terms used should not be construed to limit the claims to the specific embodiments disclosed in the specification and the claims, but should be construed to include all possible embodiments along with the full scope of equivalents to which such claims are entitled.

The invention claimed is:

1. An exciter circuit for an externally excited synchronous machine, comprising:
   two voltage supply terminals for a voltage supply;
   two exciter current terminals to be connected to an exciter winding of the externally excited synchronous machine;
   a bridge circuit hooked up to the voltage supply terminals;
   a controller; and
   a protective layout at a side of the exciter circuit with the exciter current terminals,
   wherein the protective layout, includes:
      a semiconductor switch, which in operation, is switched in series with the exciter winding, and switched in parallel with a protective diode which is blocking in an exciter current flow direction; and
      a cut-off voltage decay path running in parallel with the exciter winding and having a connection point between the bridge circuit and the semiconductor switch, wherein the cut-off voltage decay path includes at least one Zener diode layout which is blocking in the exciter current flow direction, which defines a breakdown voltage and includes at least one Zener diode, and
   wherein the controller, in operation, opens the semiconductor switch when a rapid de-exciting signal is present.

2. The exciter circuit according to claim 1, wherein the bridge circuit is configured as an asymmetrical bridge.

3. The exciter circuit according to claim 1, wherein the semiconductor switch is an insulated-gate bipolar transistor (IGBT) or a metal-oxide-semiconductor field-effect transistor (MOSFET).

4. The exciter circuit according to claim 3, wherein the semiconductor switch is an N-channel MOSFET.

5. The exciter circuit according to claim 4, wherein the semiconductor switch is provided in a return path of the exciter current.

6. The exciter circuit according to claim 1, wherein the Zener diode layout is configured such that the breakdown voltage is larger than an operating voltage used to generate the exciter current or the Zener diode layout includes multiple Zener diodes switched in series.

7. The exciter circuit according to claim 1, wherein the controller, in operation, triggers the bridge circuit in a recovery mode when the rapid de-exciting signal is present.

8. The exciter circuit according to claim 1, wherein the controller, in operation, closes the semiconductor switch and to operate the bridge circuit in a recovery mode or a freewheeling mode after a cut-off voltage on the exciter winding falls below the breakdown voltage or after a predetermined time has lapsed.

9. The exciter circuit according to claim 1, wherein the controller, in operation, operates the semiconductor switch in a closed state in a normal operation, in which no rapid de-exciting signal is present or the rapid de-exciting signal is an accident signal or a fault signal.

10. A motor vehicle, comprising:
an externally excited synchronous machine;
an exciter circuit associated with the externally excited synchronous machine,
wherein the exciter circuit includes:
two voltage supply terminals for a voltage supply;
two exciter current terminals to be connected to an exciter winding of the externally excited synchronous machine;
a bridge circuit hooked up to the voltage supply terminals;
a controller; and
a protective layout at a side of the exciter circuit with the exciter current terminals; and
wherein the protective layout, includes:
a semiconductor switch, which in operation, is switched in series with the exciter winding, and switched in parallel with a protective diode which is blocking in an exciter current flow direction; and
a cut-off voltage decay path running in parallel with the exciter winding and having a connection point between the bridge circuit and the semiconductor switch, wherein the cut-off voltage decay path includes at least one Zener diode layout which is blocking in the exciter current flow direction, which defines a breakdown voltage and includes at least one Zener diode,
wherein the controller, in operation, opens the semiconductor switch when a rapid de-exciting signal is present; and
a power electronics layout including an inverter connected to a voltage network associated with the synchronous machine.

11. The motor vehicle according to claim 10, wherein the exciter circuit is realized as part of an exciter module including a housing.

12. The motor vehicle according to claim 11, further comprising a cooling device having a heat sink to which the exciter circuit is thermally connected for heat dissipation by the protective layout.

13. The motor vehicle according to claim 12, wherein the cooling device is in the exciter module.

14. The motor vehicle according to claim 12, wherein at least a portion of the power electronics layout is also thermally connected to the heat sink for heat dissipation.

15. The motor vehicle according to claim 12, wherein at least one power module including a housing is also thermally connected to the heat sink for heat dissipation.

16. The motor vehicle according to claim 10, wherein the synchronous machine is a traction machine of the motor vehicle, and wherein the motor vehicle is an electric motor vehicle.

17. A method for de-exciting an exciter winding of an externally excited synchronous machine, the method comprising:
providing an exciter circuit for the externally excited synchronous machine, the exciter circuit including:
two voltage supply terminals for a voltage supply;
two exciter current terminals to be connected to an exciter winding of the externally excited synchronous machine;
a bridge circuit hooked up to the voltage supply terminals;
a controller; and
a protective layout at a side of the exciter circuit with the exciter current terminals; and
wherein the protective layout, includes:
a semiconductor switch, which in operation, is switched in series with the exciter winding, and switched in parallel with a protective diode which is blocking in an exciter current flow direction; and
a cut-off voltage decay path running in parallel with the exciter winding and having a connection point between the bridge circuit and the semiconductor switch, wherein the cut-off voltage decay path includes at least one Zener diode layout which is blocking in the exciter current flow direction, which defines a breakdown voltage and includes at least one Zener diode; and
opening the semiconductor switch when a rapid de-exciting signal is present.

* * * * *